United States Patent
Ty Tan et al.

(10) Patent No.: US 8,885,991 B2
(45) Date of Patent: Nov. 11, 2014

(54) CIRCUIT SWITCHED OPTICAL INTERCONNECTION FABRIC

(75) Inventors: Michael Renne Ty Tan, Menlo Park, CA (US); Nathan Lorenzo Binkert, Redwood City, CA (US); Norman Paul Jouppi, Palo Alto, CA (US); Moray McLaren, Bristol (GB); Jung Ho Ahn, Seoul (KR)

(73) Assignee: Hewlett-Packard Development Company, L.P., Houston, TX (US)

( * ) Notice: Subject to any disclaimer, the term of this patent is extended or adjusted under 35 U.S.C. 154(b) by 49 days.

(21) Appl. No.: 13/384,878

(22) PCT Filed: Dec. 21, 2009

(86) PCT No.: PCT/US2009/069038
§ 371 (c)(1),
(2), (4) Date: Mar. 2, 2012

(87) PCT Pub. No.: WO2011/078844
PCT Pub. Date: Jun. 30, 2011

(65) Prior Publication Data
US 2012/0263414 A1 Oct. 18, 2012

(51) Int. Cl.
*G02B 6/35* (2006.01)
*G02B 6/43* (2006.01)

(52) U.S. Cl.
CPC . *G02B 6/43* (2013.01); *G02B 6/351* (2013.01); *G02B 6/3596* (2013.01); *G02B 6/3556* (2013.01); *G02B 6/3598* (2013.01)
USPC ............................................. 385/18; 385/16

(58) Field of Classification Search
USPC ...................................................... 385/18, 16
See application file for complete search history.

(56) References Cited

U.S. PATENT DOCUMENTS

| | | | |
|---|---|---|---|
| 4,420,219 A | 12/1983 | Muchel | |
| 4,943,136 A | 7/1990 | Popoff | |
| 5,035,482 A * | 7/1991 | ten Berge et al. | 385/16 |
| 5,071,216 A | 12/1991 | Sullivan | |
| 5,155,784 A | 10/1992 | Knott | |
| 5,208,884 A | 5/1993 | Groh et al. | |
| 5,216,732 A | 6/1993 | Knott | |
| 5,309,537 A | 5/1994 | Chun et al. | |
| 5,337,388 A | 8/1994 | Jacobowitz et al. | |
| 5,420,954 A | 5/1995 | Swirhun et al. | |

(Continued)

FOREIGN PATENT DOCUMENTS

| CN | 1234615 A | 11/1999 |
|---|---|---|
| CN | 101334503 | 12/2008 |

(Continued)

OTHER PUBLICATIONS

European Search Report (Supplementary), Oct. 11, 2013. EP Patent Application No. 10842367.4.

(Continued)

*Primary Examiner* — Kaveh Kianni

(57) ABSTRACT

A circuit switched optical interconnection fabric includes a first hollow metal waveguide and a second hollow metal waveguide which intersects the first hollow metal waveguide to form an intersection. An optical element within the intersection is configured to selectively direct an optical signal between the first hollow metal waveguide and a second hollow metal waveguide.

20 Claims, 14 Drawing Sheets

(56) References Cited

U.S. PATENT DOCUMENTS

| | | | |
|---|---|---|---|
| 5,424,573 A | 6/1995 | Kato et al. | |
| 5,428,698 A * | 6/1995 | Jenkins et al. | 385/27 |
| 5,440,658 A | 8/1995 | Savage, Jr. | |
| 5,521,992 A | 5/1996 | Chun et al. | |
| 5,537,503 A | 7/1996 | Tojo et al. | |
| 5,545,893 A | 8/1996 | Brown et al. | |
| 5,562,838 A | 10/1996 | Wojnarowski et al. | |
| 5,664,039 A | 9/1997 | Grinderslev et al. | |
| 5,675,685 A * | 10/1997 | Fukuda et al. | 385/89 |
| 5,761,350 A | 6/1998 | Koh | |
| 5,768,458 A | 6/1998 | Ro et al. | |
| 5,774,245 A | 6/1998 | Baker | |
| 5,793,919 A | 8/1998 | Payne et al. | |
| 5,796,896 A | 8/1998 | Lee | |
| 5,809,191 A | 9/1998 | Stevens et al. | |
| 5,960,138 A | 9/1999 | Shimoji et al. | |
| 6,007,257 A | 12/1999 | Ogawa et al. | |
| 6,016,211 A | 1/2000 | Szymanski et al. | |
| 6,062,740 A | 5/2000 | Ohtsuka et al. | |
| 6,133,552 A * | 10/2000 | Saulnier et al. | 219/446.1 |
| 6,147,817 A | 11/2000 | Hashizume | |
| 6,227,719 B1 | 5/2001 | Aoki et al. | |
| 6,345,132 B1 | 2/2002 | Picard et al. | |
| 6,370,292 B1 | 4/2002 | Strake | |
| 6,390,690 B1 | 5/2002 | Meis et al. | |
| 6,501,869 B1 * | 12/2002 | Athale | 385/18 |
| 6,597,824 B2 | 7/2003 | Newberg et al. | |
| 6,625,341 B1 * | 9/2003 | Novotny | 385/18 |
| 6,658,175 B2 | 12/2003 | Zami et al. | |
| 6,763,158 B1 | 7/2004 | Zhang et al. | |
| 6,789,953 B1 | 9/2004 | DeJong et al. | |
| 6,819,827 B2 | 11/2004 | Kobayashi et al. | |
| 6,842,551 B1 | 1/2005 | Vogley | |
| 6,845,184 B1 | 1/2005 | Yoshimura et al. | |
| 6,863,444 B2 | 3/2005 | Anderson et al. | |
| 6,967,347 B2 | 11/2005 | Estes et al. | |
| 7,010,232 B1 | 3/2006 | Ott | |
| 7,086,788 B2 | 8/2006 | Mazotti et al. | |
| 7,283,594 B1 * | 10/2007 | Wood | 375/278 |
| 7,336,900 B2 | 2/2008 | DeCusatis et al. | |
| 7,366,423 B2 | 4/2008 | Levy et al. | |
| 7,541,058 B2 | 6/2009 | Chan et al. | |
| 7,551,811 B2 | 6/2009 | Aoki et al. | |
| 7,664,404 B2 | 2/2010 | Maul et al. | |
| 8,231,230 B2 * | 7/2012 | Wachter | 353/85 |
| 8,693,814 B2 * | 4/2014 | Rosenberg et al. | 385/14 |
| 2003/0174965 A1 | 9/2003 | Nishimura | |
| 2004/0096152 A1 | 5/2004 | Nakama et al. | |
| 2004/0247242 A1 | 12/2004 | Blasingame et al. | |
| 2005/0135742 A1 | 6/2005 | Basavanhally et al. | |
| 2006/0188265 A1 | 8/2006 | Maul et al. | |
| 2006/0274992 A1 * | 12/2006 | Shimura et al. | 385/14 |
| 2009/0303443 A1 * | 12/2009 | Wachter | 353/20 |
| 2011/0013866 A1 * | 1/2011 | Rosenberg et al. | 385/14 |
| 2011/0069963 A1 * | 3/2011 | McLaren et al. | 398/115 |
| 2011/0268392 A1 * | 11/2011 | Rosenberg et al. | 385/75 |

FOREIGN PATENT DOCUMENTS

| | | | |
|---|---|---|---|
| EP | 0508309 A2 | 10/1992 | |
| EP | 1345052 B1 | 9/2005 | |
| JP | 04-301812 | 10/1992 | |
| WO | WO-0188586 A2 | 11/2001 | |
| WO | WO-2004083916 | 9/2004 | |
| WO | WO 2004083916 A1 * | 9/2004 | G02B 6/12 |

OTHER PUBLICATIONS

Robert Bicknell et al., "Fabrication and characterization of hollow metal waveguides for optical interconnect applications," Applied Physics A, 2009, pp. 1059-1066, vol. 95, Springer-Verlag.

* cited by examiner

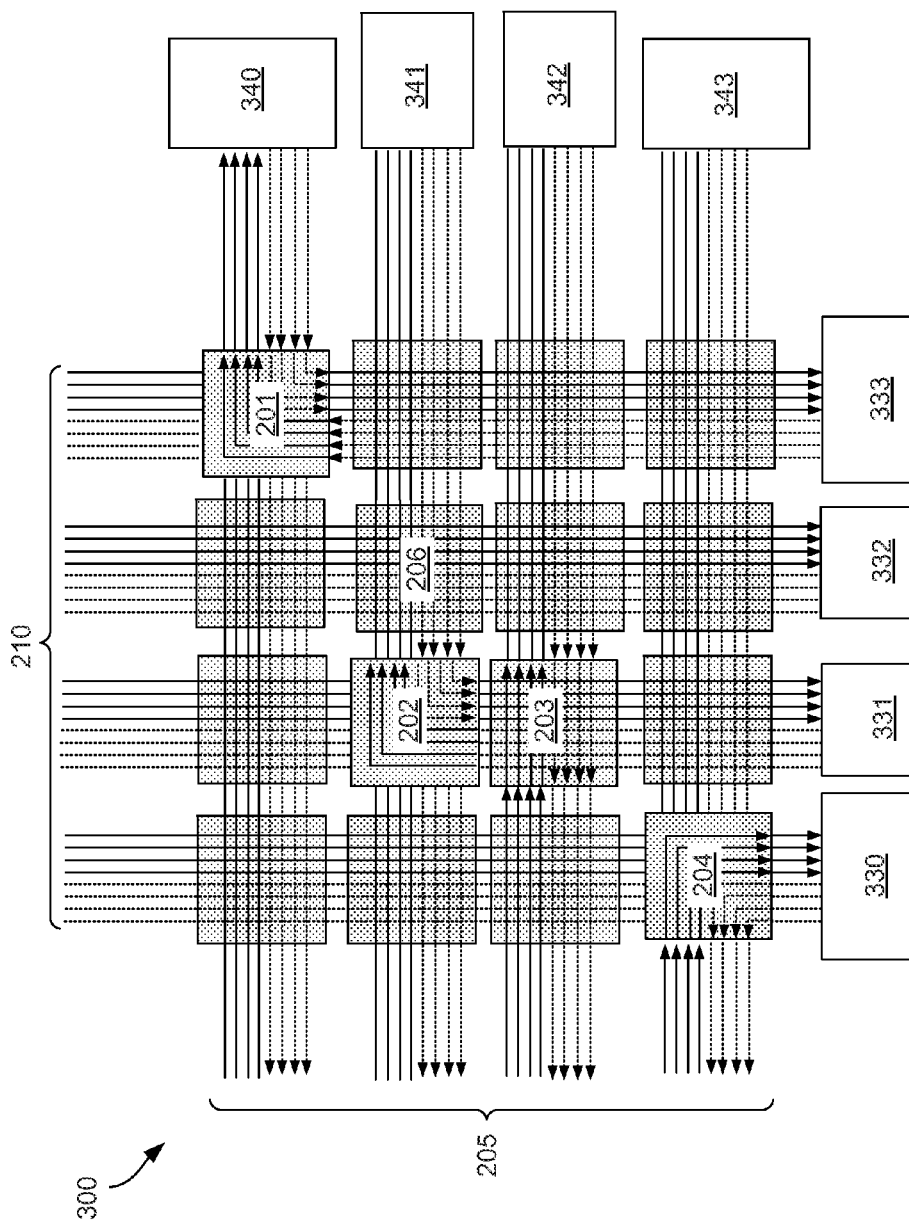

CIRCUIT SWITCHED OPTICAL INTERCONNECTION FABRIC

BACKGROUND

Light beams or optical signals are frequently used to transmit digital data. For example, optical signals can be used to transmit data over large distances, between electronic components on nearby circuit boards, or between electronic components on a single circuit board. For large scale interconnections between multiple electronic components, an optical fabric can be used. An optical fabric can have a number of characteristics, including the ability to connect any or all of the inputs to any or all of the outputs with a minimal number of components. It can be also desirable for an optical fabric to have high coupling efficiency, the ability to reroute a workload to eliminate system congestion, modularity, high reliability, and low cost.

BRIEF DESCRIPTION OF THE DRAWINGS

The accompanying drawings illustrate various embodiments of the principles described herein and are a part of the specification. The illustrated embodiments are merely examples and do not limit the scope of the claims.

FIGS. 3A-3B are diagrams of an illustrative optical interconnection fabric which incorporates a number of crossbar switches, according to one embodiment of principles described herein.

Throughout the drawings, identical reference numbers designate similar, but not necessarily identical, elements.

DETAILED DESCRIPTION

Figure 1:
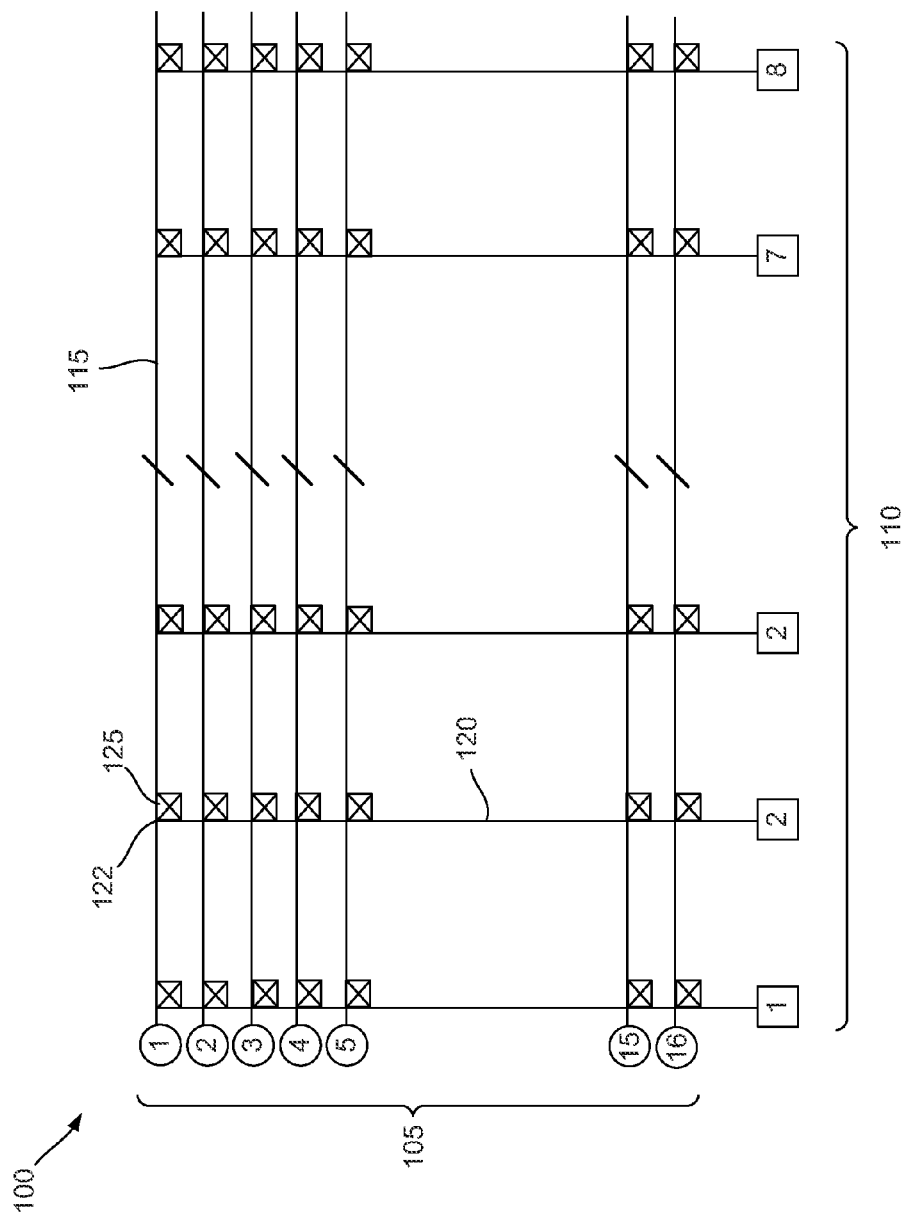
FIG. 1 is a diagram of an illustrative circuit switched optical interconnection fabric, according to one embodiment of principles described herein.

Light beams or optical signals are frequently used to transmit digital data. For example, optical signals can be used to transmit data between electronic components on a single circuit board, or between electronic components on nearby circuit boards. These optical signals can be routed using waveguides. Waveguides carry optical energy by imposing boundaries which control the expansion of the optical energy and guide it to a desired location. One aspect of optical communication is the interconnection between the optical channel to various other devices such as backplanes, electronic devices, semiconductor lasers, photo-detectors, other components. A good optical interconnect between waveguides should have high coupling efficiency, ease of making the coupling, low cost, reconfigurability, and produce a reliable connection.

It has been discovered that a hollow metal waveguide can be a surprisingly efficient and inexpensive waveguide which lends itself to the creation of a circuit switched optical interconnection fabric. Hollow metal waveguides include a hollow air core surrounded by highly reflective metallic wall. Hollow metal waveguides can be fabricated in a variety of substrates, including silicon, glass, polycarbonate etc. A variety of patterning processes including sawing, laser machining, wet and dry etching, injection molding, compression molding, extrusion, and other suitable processes can be used to form the hollow metal waveguides. For example, some forms of plastic injection molding can be used to create trenches which can be metalized to form hollow metal waveguides. According to one illustrative embodiment, the sidewalls and bottom of these trenches are metalized using a sputtering process to provide a highly reflective surface at the wavelengths of interest. For example, silver or gold can be sputter coated into the trenches to provide the reflective coating. In some embodiments, it may be advantageous to overcoat the silver with a passivation layer, such as aluminum nitride, which protects the coating and prevents oxidization. Additionally an undercoat may be provided to improve the adhesion of the silver layer to the substrate. A waveguide cover can then be attached over the patterned substrate to cover the trenches and complete the hollow metal waveguides. Typical dimensions of a hollow metal waveguide cross-section may be approximately 100 microns×100 microns or 150 microns×150 microns. The size and geometry of the waveguides can be altered according to the specific design.

The low index air cores of the hollow metal waveguides produce several unique features not found in more widely investigated polymer core waveguides. These hollow metal waveguides offer the potential of very low optical loss, low coupling losses, very low beam divergence, and low modal dispersion required in optical interconnect systems. In contrast to polymer or other solid waveguides, the light guided inside the hollow metal waveguides exhibits a very low beam divergence allowing gaps to be introduced between sections of waveguides with very low loss as the light traverses these gaps. This property will be exploited in this invention. Also, the hollow metal waveguides do not have reflective losses at the input and output facets as compared to solid core waveguides. These waveguides may be thought of as free space propagation plus a little guiding by the metal walls to compensate for the effects of diffraction. Some embodiments of silver-coated hollow metal waveguides fabricated in silicon have achieved losses lower than 0.05 dB/cm. Air core of the hollow metal waveguides produce very little optical dispersion, which allows the hollow metal waveguides to transmit data at rates approaching terahertz frequencies.

Illustrative applications and examples of hollow metal waveguides which incorporate various optical operators to manipulate the light passing through a hollow metal waveguide are discussed in PCT App. No. WO 2011084155, filed Jan. 6, 2010, entitled "Optical Interconnect" to Michael Tan et al., which is incorporated by reference herein in its entirety.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Computers and other devices can be optically connected to a backplane. As used in the specification and appended claims, the term "backplane" refers to a structure which has multiple communication channels which can be accessed through a number of integrated sockets or other receptacles. For example, a backplane may contain a common bus to which a number of separate devices may connect. Backplane communication channels may include electrical wires, optical fibers, hollow metal waveguides, or other channels. The backplane may contain optical to electrical transducers, signal processing electronics, various types of light sources. Where the term "optical backplane" is used, the backplane contains at least one channel which is configured to convey optical signals through the backplane.

According to one illustrative embodiment, an optical interconnection fabric includes dynamically reconfigurable circuit switched optical crossbars which allow N input nodes to connect to any of M output nodes. In one embodiment, the optical crossbars can be created by low cost injection molding processes. A number of crosspoints route optical signals from the input nodes to the output nodes. The crosspoints can be implemented in a variety of ways including mechanical actuators or multicasting to all outputs and controlling the connections using light valves. The crosspoints, depending on the technology, can switch an input to a desired output in a millisecond to several nanoseconds.

FIG. 1, is diagram of an illustrative circuit switched optical interconnection fabric (100) which connects 16 bus ports (105) to 8 input/outputs ports (110). A number of horizontal lines (115) run from left to right and intersect each of a number of vertical lines (120). Each of the vertical lines (120) connects to one of the 8 input/output ports (110). For convenience, the horizontal lines (115) can be called "bus lines" and the vertical lines (120) "tap lines." As used in the specification and appended claims the term "crossbar" or "crossbar configuration" refers to two or more optical paths which intersect each other at a non-zero angle. The intersection of the bus lines (115) and the tap lines (120) create the optical interconnection fabric. According to one illustrative embodiment, the bus lines are an array of parallel waveguides which intersect the tap lines at approximately a 90 degree angle.

The bus lines (115) carry input and output signals through the optical fabric (100). The tap lines (120) are selectively connected to the bus lines (115) to connect a bus port (105) to an I/O port (110). A computational element, such as a computer, router, memory, storage, or other device can be connected to the input/output port(s) (110).

According to one illustrative embodiment, the bus lines (115) and tap lines (120) may be hollow metal waveguides. At each intersection (122) between the bus and tap lines, an optical element (125) can be selectively actuated to direct optical energy between the intersecting lines. By configuring an optical interconnection fabric (100) at the intersections (122) in this manner, each of the signals carried by in a bus line (115) can be directed to any of the outputs.

Figure 2A:
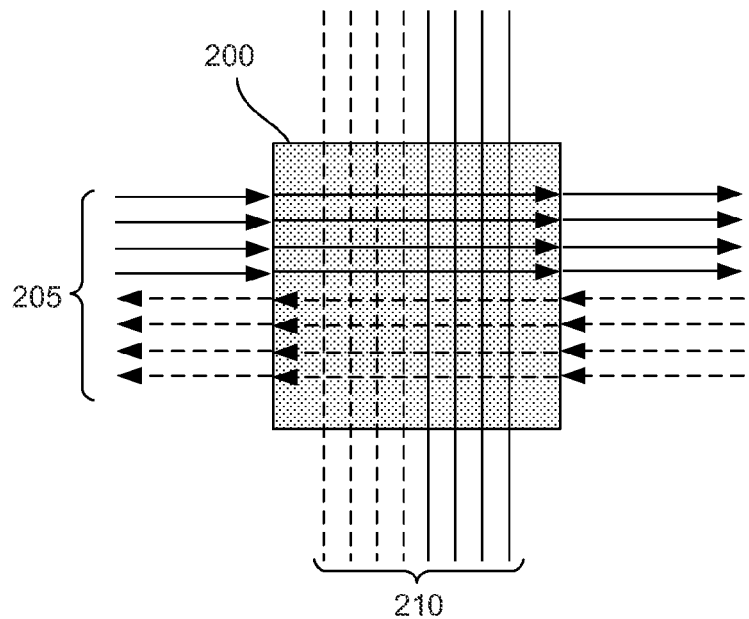
FIGS. 2A and 2B are diagrams of an illustrative crosspoint switch, according to one embodiment of principles described herein.
Figure 2B:
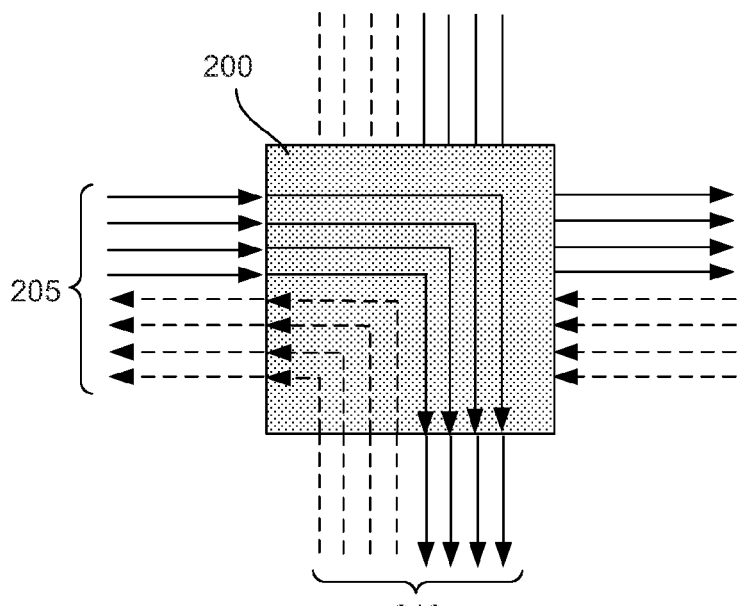

FIGS. 2A and 2B are diagrams of an illustrative crosspoint switch (200) which has at least two configurations: a through state and a crossed state. FIG. 2A shows the crosspoint switch (200) in a through state. Bus lines (205) carry signals through an optical fabric. According to one illustrative embodiment, the bus lines (205) are configured to carry bidirectional signal traffic by dividing the lines into two groups. A first group of four channels carries optical signals toward the right. These bus lines are shown as solid lines. A second group of four channels carries optical signals to the left and are represented by dashed lines or arrows. Similarly, the vertical tap lines (210) are divided into two groups, with four solid lines carrying signals down the page and four dashed lines representing tap lines which covey signals up the page. For purposes of illustration and explanation, a relatively small number of bus lines (205) and tap lines (210) have been illustrated. The crosspoint switch (200) could have more or less lines, according to needs of the system.

In the through state illustrated in FIG. 2A, bus lines (205) pass through the crosspoint switch without diversion into the tap lines (210). The signal carried by the bus lines (205) can then be received by another component connected at another location along the bus lines (205).

FIG. 2B is a diagram of the illustrative crosspoint switch (200) in a crossed state. In this state, the crosspoint switch (200) diverts the bus lines (205) into the tap lines (210). A component attached to the tap lines (210) can then establish bidirectional communication with devices through the bus lines (205) and tap lines (210). The crosspoint switch (200) may have a variety of configurations and use a number of technologies to redirect optical signals to the tap lines (210).

Figure 3A:
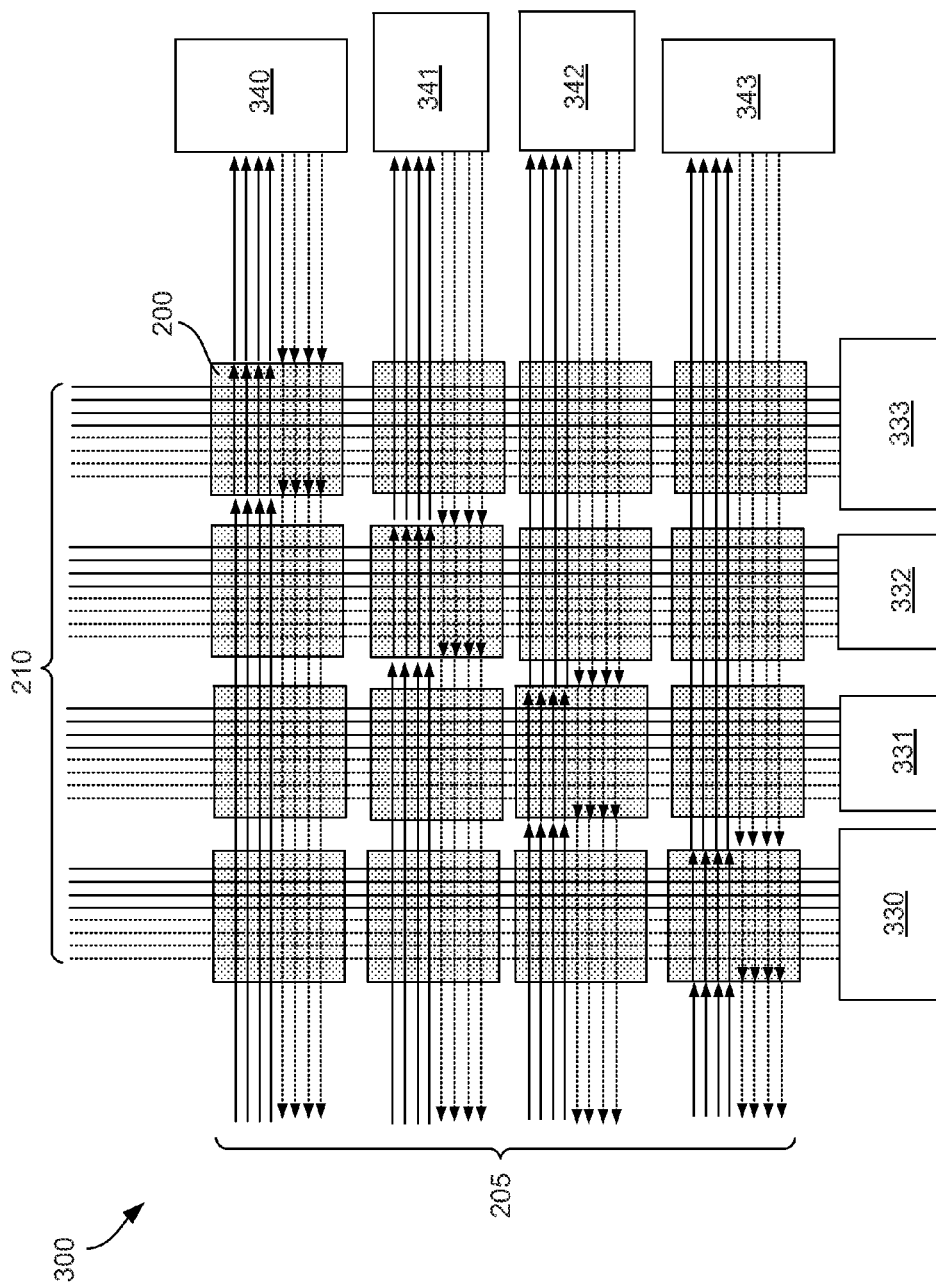

FIG. 3A is a diagram of an illustrative optical interconnection fabric (300) made up of a number of crosspoint switches (200). The crosspoint switches (200) are configured to control the connection between a number of bus lines (205) and tap lines (210). According to one illustrative embodiment, a number of devices are connected to the various lines. Computing devices (330-333) are connected along the lower portion of the optical interconnection fabric (300) and computing devices (340-343) are connected along the right side of the fabric. By way of example and not limitation, these computing devices could be computers, storage devices, routers, transmission devices, or other devices. Half of the lines are used to convey input signals and the other half are used to convey output optical signals. As discussed previously, the input lines are illustrated as solid lines and the output lines are illustrated as dashed lines. In the configuration illustrated in FIG. 3A, the crosspoint switches (200) are in the pass through state. All of the optical paths continue to run through the fabric along bus lines (205) and tap lines (210). Consequently, computing devices (330-333) along the lower portion of the optical interconnection fabric (300) are directly connected to the tap lines (210) and computing devices (340-343) on the right are connected to the bus lines (205).

FIG. 3B is a diagram of the illustrative optical interconnection fabric (300) which illustrates the versatility of the interconnection fabric in connecting the various lines (205, 210) and computing devices (330-333, 340-343). According to one illustrative embodiment, a first blade computer element (330) is connected to bus lines (210) through crosspoint (204) which is in a crossed state. First storage device (331) is connected to second storage device (341) through a combination of a third crosspoint device 203, which is in a pass through state, and a second crosspoint device (202) which is in a crossed state. A third storage device (342) is connected to the bus lines (205) through a series of optical crosspoints in pass through configuration, including crosspoint (203).

A second blade computer element (333) is connected to a third blade computer element (340) through a first crosspoint device (201) which is in a crossed state. The remaining computing device (343) is not connected to anything in the current configuration.

The optical crossbars can be reconfigured to connect any of the computing elements to any of the other computing elements. In many systems, the optical interconnection fabric can be dynamically reconfigured by changing the state of the various crosspoint devices.

FIGS. 4A through 4D are diagrams of an illustrative crosspoint switch (200). According to one illustrative embodiment, the crosspoint switch (200) is made up of a first or upper layer (305) and a second or lower layer (310) with a spacer layer (315) interposed between them. The upper layer (305) contains hollow metal waveguides (325) which are configured in the cross state. The lower layer (310) contains a second set of hollow metal waveguides (320) which are configured in the pass through state.

Figure 4A:
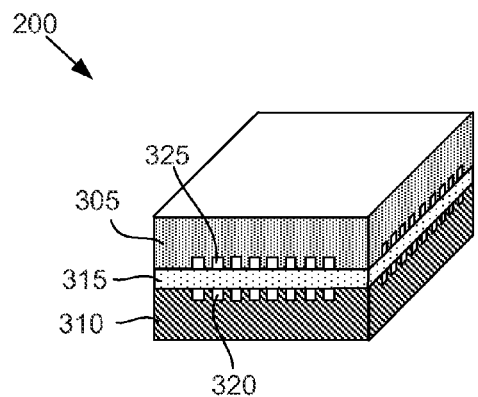
FIGS. 4A through 4D are diagrams of an illustrative crosspoint switch, according to one embodiment of principles described herein.
Figure 4B:
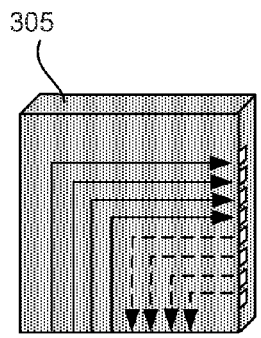
Figure 4C:
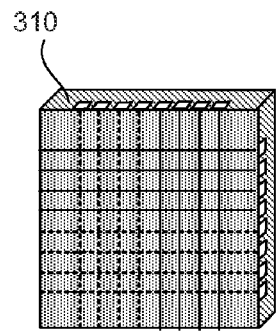

FIG. 4B is a diagram of the upper layer (305) showing the routing of the optical paths through the switch (200) for the crossed state. FIG. 4C is a diagram of the lower layer (310) showing the routing of the optical paths in the pass through state.

Figure 4D:
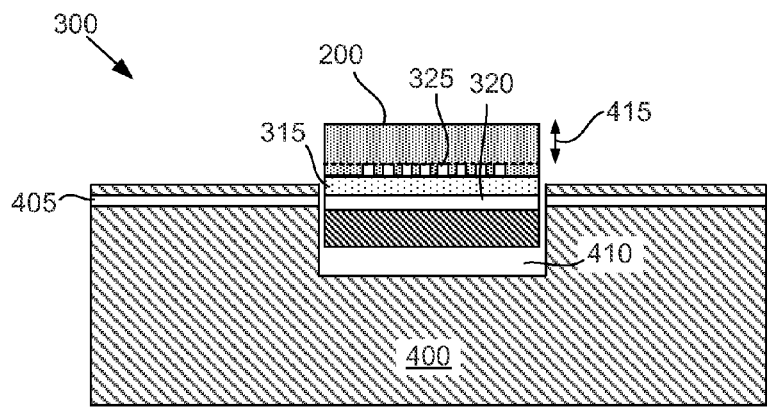

FIG. 4D is a cross-sectional diagram of a portion of an interconnection fabric (300) which shows one illustrative configuration for switching from a through state to a crossed state using the crosspoint switch (200). The crosspoint switch (200) is placed in a socket (410) in a backplane (400). A number of hollow metal waveguides (405) are formed in the backplane (400) and intersect the socket (410). The crosspoint switch (200) is configured to receive optical energy passing through the hollow metal waveguides (405) and route it appropriately. The crosspoint switch (200) is configured to move vertically up and down as shown by the double headed arrow (415). This allows the optical signals passing through the waveguides (405) in the base (400) to be selectively directed into either the upper layer (305) or lower layer (310) When the waveguides (405) in the backplane (400) are aligned with the waveguides (325) in the upper layer (305), the optical signals are diverted by the upper layer (305) and exit the upper layer (305) turned 90 degrees from their incoming angle. When the crosspoint switch (200) is raised so that the lower layer (310) is aligned with the waveguides (405), the optical signal passes through the switch without diversion and into the waveguides on the opposite side of the socket (410).

According to one illustrative embodiment, the crosspoint switch (200) is positioned using a bi-state actuator. The total vertical displacement of the crosspoint switch (200) is sufficient to switch the alignment of the waveguides (405) in the base (400) between alignment with the upper waveguides (325) and the lower waveguides (320). In one embodiment, the upper and lower waveguides (325, 320) have cross sections which are approximately 150 microns×150 microns. The center to center distance between the upper and lower waveguides (325, 320) may be approximately 250 microns. Consequently, the bi-state actuator should be configured to produce at least 250 microns of displacement to support switching in this configuration. The bi-state actuator may be formed using a number of technologies including piezoelectric actuators, micro-electrical mechanical actuators, magnetic actuators, or other technologies.

The switching speed of the crosspoint switch (200) depends on a number of factors, including the size of the crosspoint switch (200) and actuator. According to one illustrative embodiment, the crosspoint switch (200) may have a planar size of approximately 2 millimeters×2 millimeters and the actuator may have a size of approximately 2 millimeters×2 millimeters×5 millimeters.

Figure 5B:
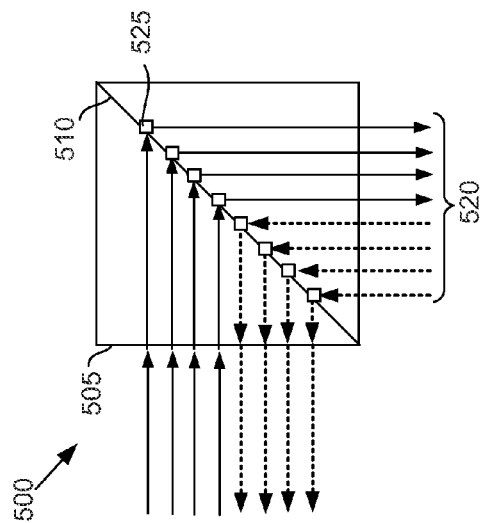
FIGS. 5A through 5E are diagrams of illustrative optical crosspoint switches which incorporate periscope prisms, according to one embodiment of principles described herein.
Figure 5D:
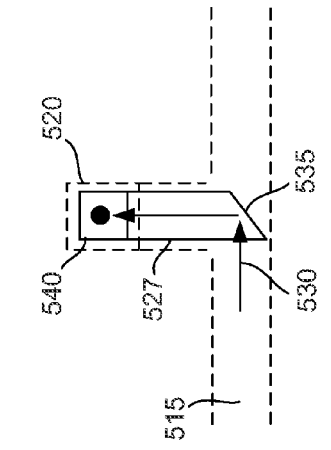
Figure 5A:
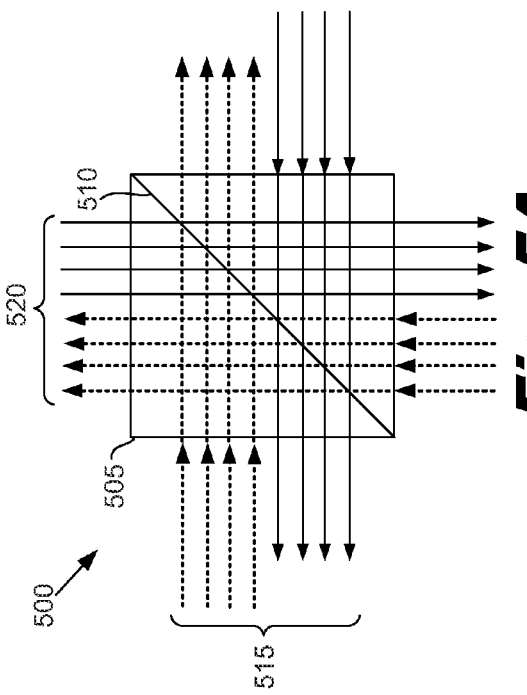

FIGS. 5A-5E are diagrams of an illustrative crosspoint switch (500) which uses moveable mirrors to selectively switch an optical signal from the through state illustrated in FIG. 5A to the crossed state illustrated in FIG. 5B. As discussed above, in the through state, the optical signals pass through the crosspoint switch (500) without diversion as illustrated in FIG. 5A. In the crossed state, the optical signals are diverted into the tap waveguides (520) as illustrated in FIG. 5B. According to one illustrative embodiment, an actuated reflective element (525) is placed in intersections between the bus waveguides (515) and the tap waveguides (520). For example, the actuated reflective element (525) may be located along a diagonal (510) which crosses the bus lines (515).

Figure 5C:
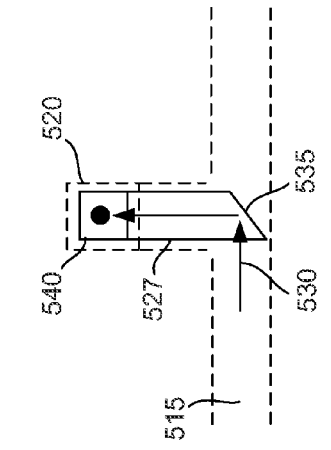

FIG. 5C is a diagram of one illustrative embodiment of an actuated reflective system within waveguide intersection. In this illustrative embodiment, the actuated reflective element (525) is a periscope prism (527). In the through state, the periscope prism (527) is positioned so that it does not interfere with the passage of optical signal (530) through the bus line (515).

FIG. 5D is a diagram which show the prism (527) extended downward into the bus line (515). The optical signal (530) traveling through the bus line (515) passes into the prism (527) and reflects upward off a first surface (535). The light is then reflected off a second surface (540) and into a tap line (520).

Figure 5E:
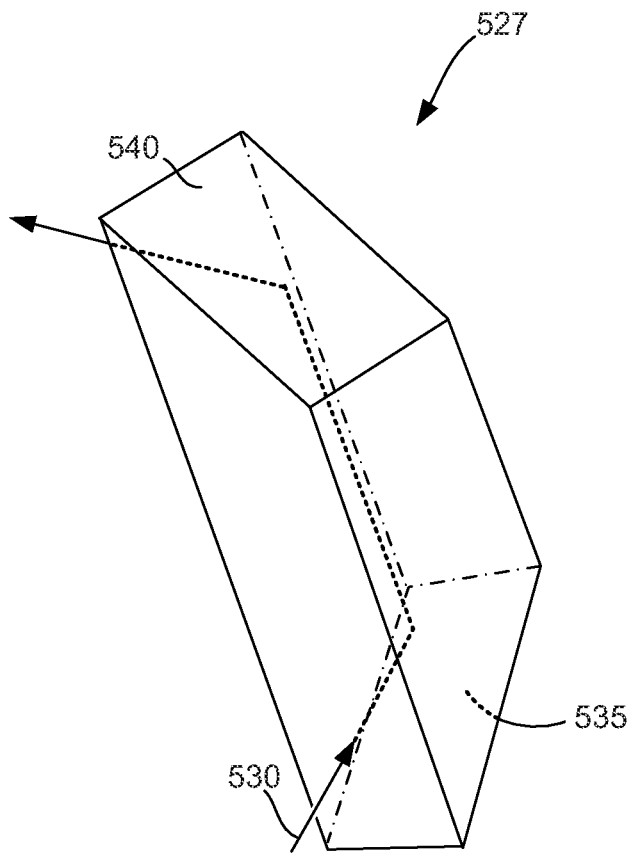

FIG. 5E is a perspective view of one embodiment of a periscope prism (527) which could be used in a crosspoint switch (500, FIG. 5A). The periscope prism (527) accepts a light beam (530) which is reflected off a first surface (535) and passes upward to strike a second surface (540). After two internal reflections, the light exits the periscope prism (525) on a different vertical plane and traveling in a direction which is rotated 90 degrees from its entry.

The use of individual prisms (527) in the intersections between bus and tap lines can result in very fast switching times between the through and crossed states. The low mass of the prisms allows for faster motion with less power than moving a larger crossbar switch. Further, in embodiments where the prisms (527) are individually actuated, the crosspoint switch (500) could provide increased flexibility in routing the optical signals. For example, in applications where signal throughput to a computing device attached to the tap lines is not a deciding factor, only a few of bus lines would be diverted into the tap lines. The remainder of the bus lines could then be used to carry other traffic. Another advantage of prisms is that the reflective surfaces of a prism (527) are relatively robust and stable. Also, total internal reflection of the light at the prism face can be used to yield a 100% reflector. Total internal reflection occurs at the interface between a high index layer and a low index layer when the incident angle is from the high index layer is greater than the critic angle $$\left(\text{i.e. } \theta_c \geq \sin^{-1}\left(\frac{n_2}{n_1}\right)\right)$$

for $n_1=1.54$ and $n_2=1$, the critical angle is 45 degrees). This may result in a more reliable operation of the crosspoint switch (500).

Figure 6A:
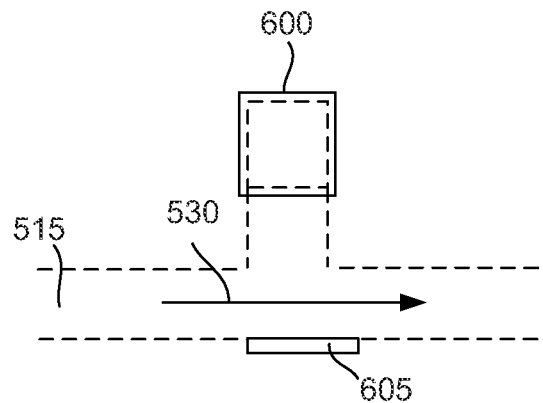
FIGS. 6A and 6B are diagrams of an illustrative optical crosspoint switch which incorporates a dynamic mirror, according to one embodiment of principles described herein.
Figure 6B:
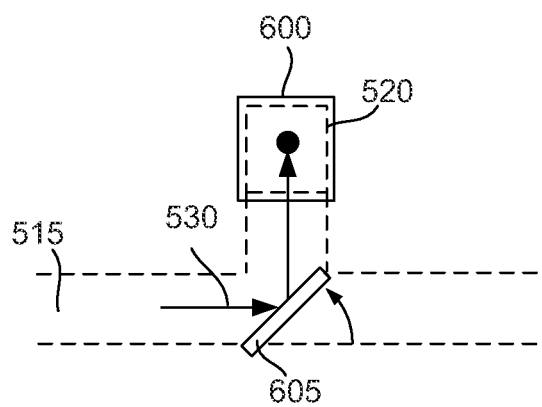

FIGS. 6A and 6B are diagrams of an alternative actuated reflective mechanism for changing the state of a crosspoint intersection. In this illustrative embodiment, the solid periscope prism (527) is replaced by a moving mirror (605) and a stationary mirror (600). In the through state which is shown in FIG. 6A, the optical signal (530) passes through the bus line (515) and is unimpeded by the moving mirror (605).

FIG. 6B shows the mechanism in the crossed state. To change from the through state to the crossed state, the moving mirror (605) is rotated into the path of the optical signal (530). The optical signal (530) is then reflected upward to the stationary mirror (600) which redirects the optical signal down a tap line (520). MEMs micro-actuators situated along the waveguide may be used to raise and lower these reflective surfaces to enable the periscope function.

Figure 7A:
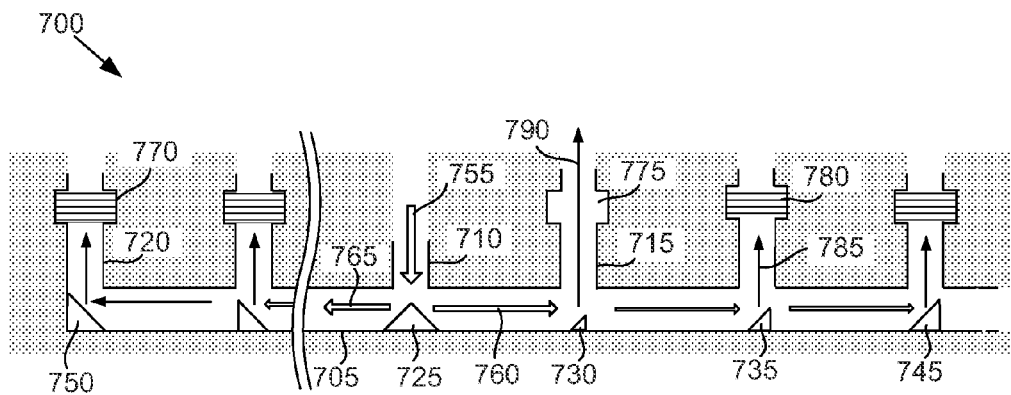
FIGS. 7A and 7B are diagrams of an illustrative optical interconnection fabric which passively distributes an optical signal to all tap lines, according to one embodiment of principles described herein.

FIG. 7A is a cross sectional diagram of an illustrative circuit switched optical interconnect fabric (700). In this illustrative embodiment, a bus line (705) is configured to distribute an optical signal (755) to all tap lines (715, 720, 785). To make this distribution, the incoming signal (755) is routed down a bus port (710) and encounters a reflective wedge (725). The wedge (725) splits the incoming signal (755) into two approximately equal signals (760, 765) which are traveling in opposite directions through the bus line (705). At each intersection between a tap line (715, 720, 785) and the bus line (705), an area based tap (730, 735, 745, 750) directs a portion of the split signals (760, 765) upward into the tap line (715, 720).

According to one illustrative embodiment, an area based tap is a reflective surface which covers a portion of the cross sectional area of a hollow metal waveguide. The optical signal traveling within the bus line (705) is uniformly distributed over the cross-section of the hollow metal waveguide. Consequently, the reflective surface of the area based taps placed in the cross-section diverts a percentage of the optical signal traveling through the bus line which is proportional to its area. The area based taps (730, 735, 740, 745) get progressively larger as the optical signal (760) moves away from the bus port (710). As each of the area based taps extract a portion of the optical signal, the amount of optical signal remaining in the bus line (705) decreases. At the end of the bus line, an end reflector (750) covers the entire area of the hollow metal waveguide and diverts all the remaining light into the last tap (720). Increasing the size of the area-based taps along the length of the bus line (705) results in an approximately equal amount of optical signal being diverted into each tap line (715, 785).

A variety of other optical elements could be used in place of the area-based taps (730, 735, 745, 750). By way of example and not limitation, partially reflective films or plates could be used to divert a portion of the optical signal (760, 765) into various taps. The partially reflective films could be partially silvered or could be wavelength or polarization sensitive or polarization insensitive.

According to one illustrative embodiment, each of the tap lines (715, 720, 785) also contains a light valve (770, 775, 780). The light valves (770, 775, 780) selectively block or transmit optical signals through the tap lines. The light valves can also be used to discard the light. By controlling the transmission of optical signal through the tap lines, the light valves (770, 775, 780) can configure the interconnection fabric (700) to interconnect specific elements attached to the fabric. In the illustrative example shown in FIG. 7A, all of the light valves are closed except for light valve (775) which is open to admit a diverted ray (790) to pass through tap line (715).

Figure 7B:
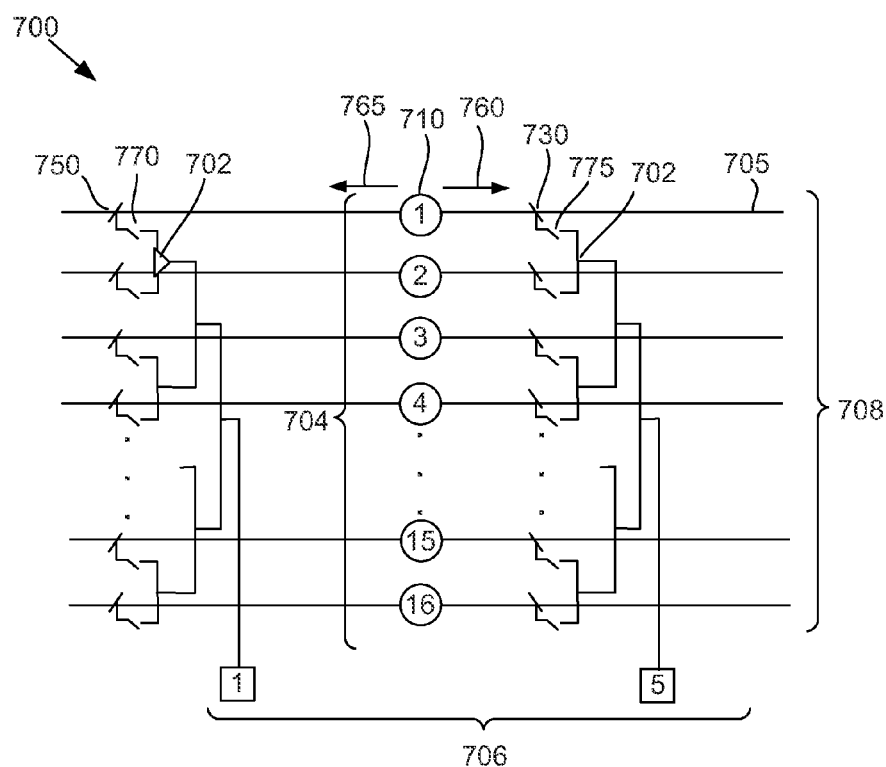

FIG. 7B is a diagram which shows a plan view of the interconnection fabric (700). The bus lines (708) run horizontally across the fabric (700). A number of bus ports or light sources (704) are attached to each bus line (708). For example, bus port 1 (710) is connected to the uppermost bus line (705). As discussed above with respect to FIG. 7A, the input light is diverted into two beams (760, 765) which travel in opposite directions down the bus line (705). As the beams (760, 765) encounter area-based taps (730, 750), they are diverted into the tap lines and encounter the light valves (770, 775). If the light valves for a particular input/output port are open, the light from each of the bus lines is combined by a combining element (702). This is repeated at several levels until the combined signal is delivered to the correct input/output port (706).

This configuration has several advantages. By sending the light to the left and right from the input node, optical losses are better distributed over the entire fabric. Further, in the configuration illustrated in FIGS. 7A and 7B, there are some embodiments where there are no mechanical moving parts in the optical fabric. For example, if the light valves were constructed using electro-chromic or liquid crystal technology, the resulting optical fabric may be more robust because there is no mechanical motion required to configure or reconfigure the fabric. These liquid crystal switches can also be switched on the order of a few microseconds.

The example given above is only one of many possible configurations. For example, both the area based splitters and the light valves could be replaced by moving mirrors. Depending on the size of the moving mirror, switching times could be on the order of 100 nanoseconds.

One challenge in designing an optical interconnection fabric is budgeting and reducing optical losses that are experienced by an optical signal traveling through the system. Each time the optical signal encounters an obstacle or discontinuity in its path, a portion of the light is lost due to absorption and/or scattering. Although, hollow metal waveguides exhibit very little light loss at each of the intersections since the light is nearly collimated inside the waveguide, there is still some loss. In general, the more elements the optical signal encounters, the higher the losses within the fabric. Further, certain types of elements can introduce greater losses than other elements. Consequently, to reduce the optical losses it can be desirable to reduce the overall number of elements optical signal encounters within the optical fabric and to weigh the use of each element against the benefit it provides.

Figure 8A:
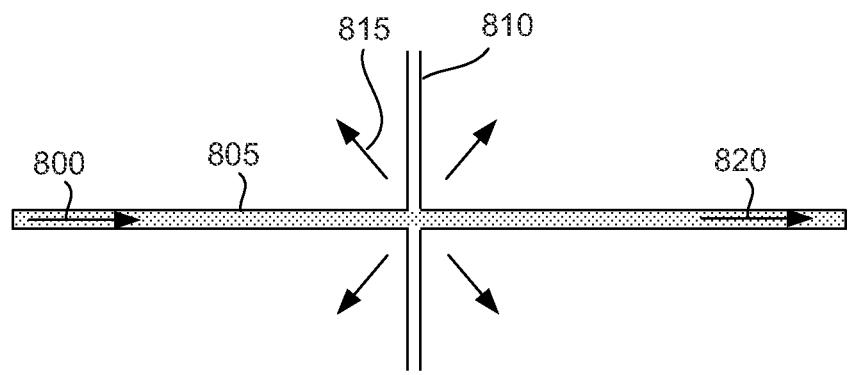
FIGS. 8A and 8B are diagrams which show optical losses in optical elements which can be used within a circuit switched optical interconnection fabric, according to one embodiment of principles described herein.

FIG. 8A is a diagram which shows a simple intersection between two hollow metal waveguides (805, 810). An input beam (800) travels through the horizontal waveguide (805) from the left and encounters the intersection. A portion of the optical energy in the input beam (800) is lost as scattered light (815). Consequently, the exiting beam (820) has a lower intensity than the input beam (800).

Measurements and modeling have shown that losses at individual intersections can be comparatively minimal. For example, the exiting beam (820) may have approximately 99% of the intensity of the input beam (800). However, in designs where the optical signal encounters large numbers of intersections, this loss can become significant. For example, in the optical fabric illustrated in FIGS. 3A and 3B, there are 32 tap lines for each computing element. If 16 computing elements are interconnected using the optical fabric (300, FIG. 3B), then it can be shown that a given line may encounter as many as 512 intersections. Using the worst case scenario, the magnitude of an exiting optical signal beam after encountering 512 crossing is only about 2% of the original input magnitude. One method of reducing these loses is to reduce the number of waveguide crossings in the optical fabric.

Figure 8B:
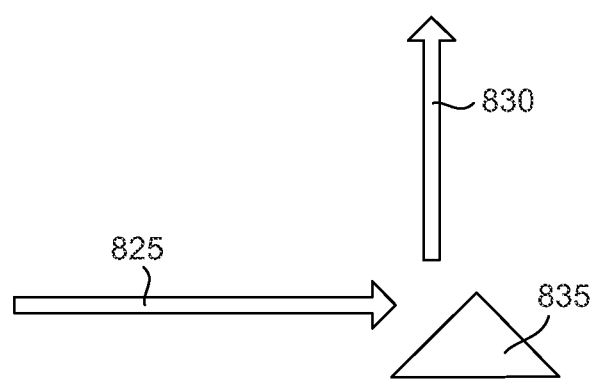

FIG. 8B shows an input beam (825) traveling from left to right which encounters a combiner (835). The exit beam (830) is reflected upward. According to one illustrative embodiment, the transmission of the combiner (835) may be approximately 75 to 80%. Consequently, the exit beam (830) has only about 80% of the energy of the input beam (825).

Figure 9:
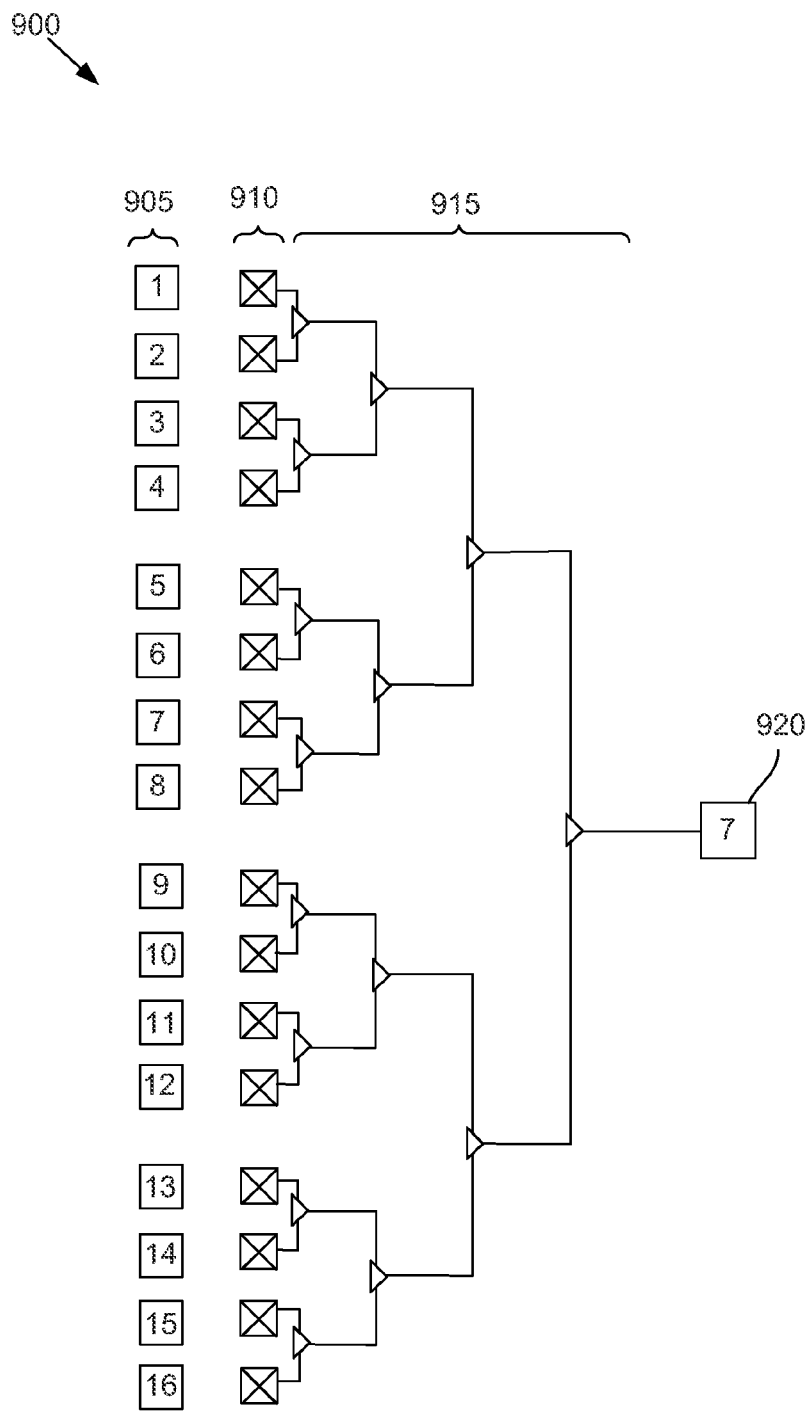
FIG. 9 is a diagram of a tree topology which combines optical signals from a plurality of taps into a single I/O port, according to one embodiment of principles described herein.

Given the transmission of the intersections in FIG. 8A and the transmission of the combiner in FIG. 8B, optical efficiency of various optical interconnection fabrics can be calculated. FIG. 9 shows a portion of an optical multiplexer/demultiplexer (900) which is similar to that shown in FIGS 7A and 7B. The optical signals are routed from 16 inputs (905) through light valves or MEMs crosspoints (910). The signals are combined by passing through a series of combiners (915) to a single tap which is connected to the input/output port (920).

Assuming an input power of +5 dBm and a wavelength of 1550 nanometers, the estimated optical losses for a signal which passes through the multiplexer/demultiplexer (900) are given in the table below:

TABLE 1

| | |
|---|---|
| Optical Splitter = | −7.0 dB |
| Light valve loss = | −1.0 dB |
| Combiner loss = | −3.9 dB |
| Propagation loss = | −3.0 dB |
| Total Loss = | −14.9 dB |

Figure 10:
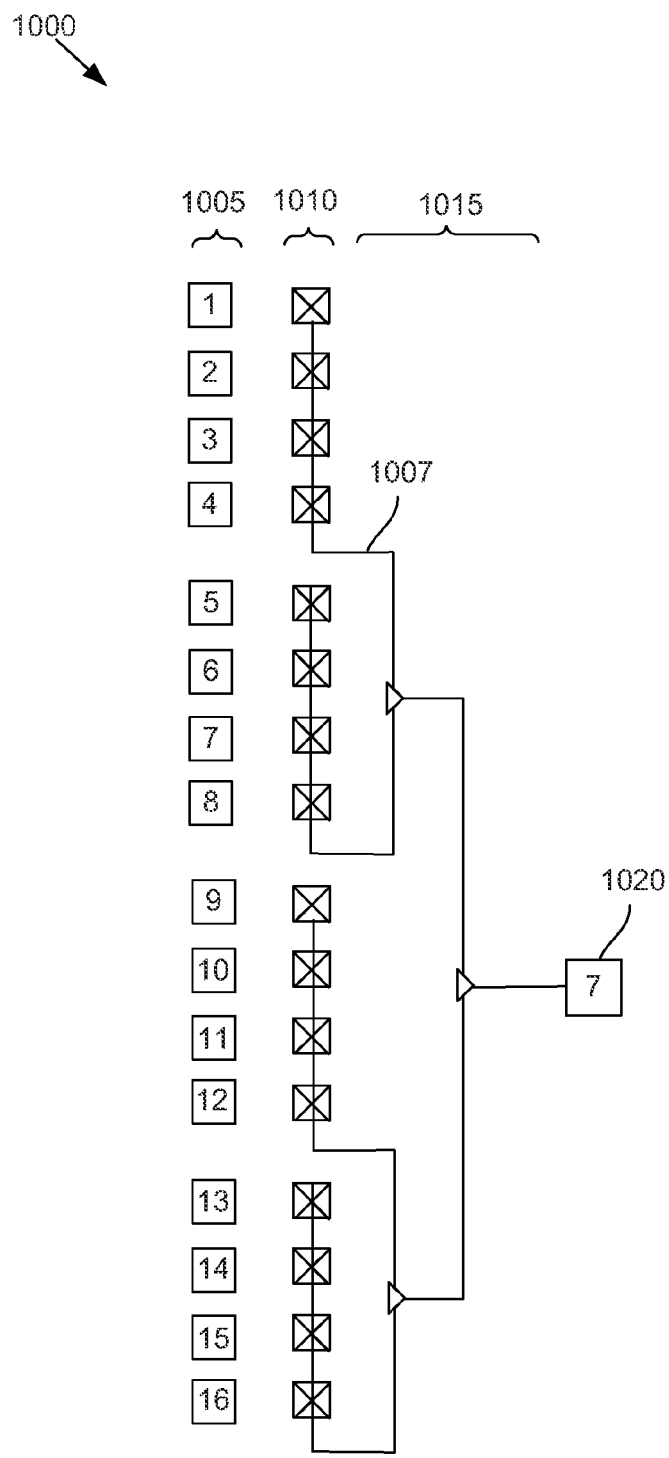
FIG. 10 is a diagram of a tree topology in which individual tap lines receive optical signals from a plurality of bus ports, according to one embodiment of principles described herein.

FIG. 10 shows an alternative optical multiplexer/demultiplexer (1000). The optical signals are routed from 16 inputs (1005) through light valves or MEMs crosspoints (1010). Four light valves direct optical signals from four bus ports into a single tap line (1007). Using a tree architecture (1015), the optical signal from two tap lines is combined using a combiner and then combined again to form a single output which is directed to the input/output port (1020). Compared to the optical multiplexer/demultiplexer (900, FIG. 9) shown in FIG. 9, this optical multiplexer/demultiplexer (1000) has two fewer combiners, but has 32 waveguide crossings per input. The transmission through the waveguide crossings is estimated at 78%. The combiner transmission through a single combiner is estimated at 78%. Consequently, the overall transmission through the waveguide crossings and two consecutive combiners is estimated to be 47%.

Figure 11:
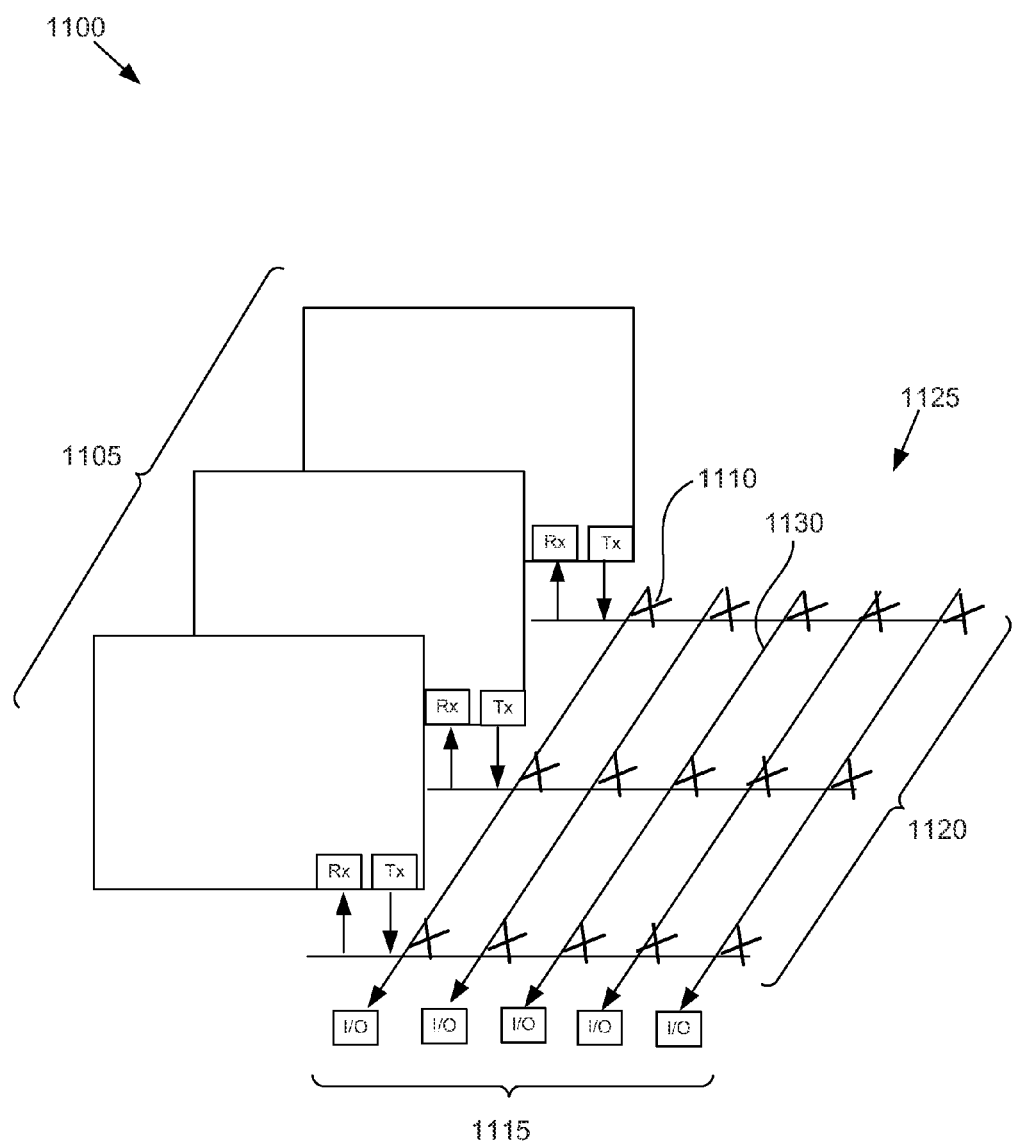
FIG. 11 is a diagram of a computer system which uses a circuit switched optical interconnection fabric which interconnects a number of blade computers, according to one embodiment of principles described herein.

The optical interconnection fabrics described above can be used in a variety of applications. For example, the multiplexers/demultiplexers shown in FIGS. 9 and 10 could be used in a Clos network. FIG. 11 is a diagram of an illustrative computer system (1100) which includes a number of blade computers (1105) which are connected to the optical interconnection fabric (1125). According to one illustrative embodiment, there are 16 blade computers (1105) attached to the optical interconnection fabric (1125). The optical interconnection fabric (1125) includes a number input/output ports (1115) connected to bus lines (1130). The tap lines (1120) are connected to the bus lines (1130) to crosspoint switches (1110).

A number of tap lines (1120) are connected to the blades (1105). According to one illustrative embodiment, the blades (1105) are connected to the tap lines (1120) through a PCI-E connector with 16 transmit lines and 16 receive lines, for a total of 32 lines per blade. For clarity of illustration, these lines have shown as a single transmit line and a single signal receive line which are connected to the receive module (Rx) and transmit module (Tx). Additionally, the number of blades and lines has been reduced in FIG. 11 for clarity of illustration. The optical fabric (1125) can have any of a number of configurations, including those illustrated in the preceding figures.

Figure 12:
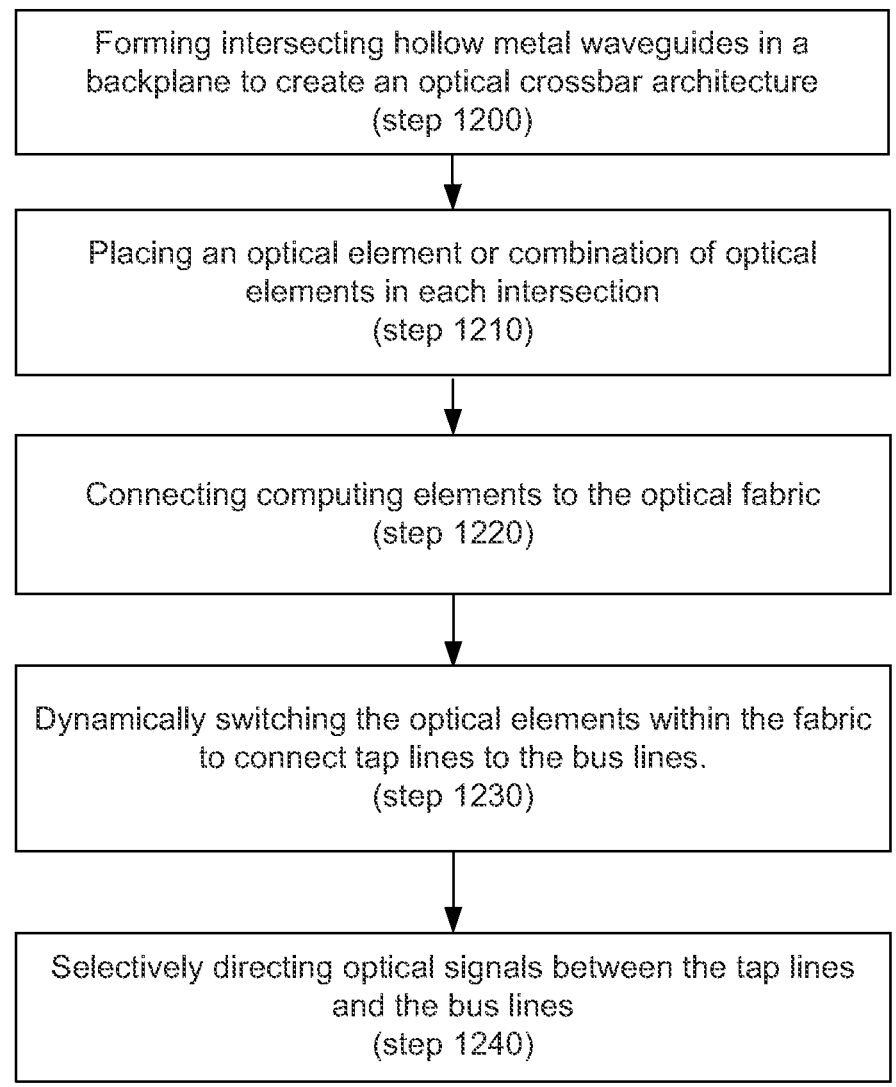
FIG. 12 is a flowchart which shows one illustrative method for creating and configuring a circuit switched optical interconnection fabric, according to one embodiment of principles described herein.

FIG. 12 is a flowchart which describes one illustrative method for creating and configuring a circuit switched optical interconnection fabric. A first step includes forming hollow metal waveguides in a backplane to create the optical crossbar architecture (step 1200). For example, a first group of parallel crossbars may be bus lines which traverse the length of the backplane, while a second group of parallel crossbars may be tap lines which intersect the bus lines and are connected to a computing element.

A second step includes placing an optical element or combination of optical elements in each intersection to selectively direct optical signals from the bus lines into the tap lines and vice versa (step 1210). These optical elements may include prisms, mirrors, light valves and other optical elements. The optical elements may be dynamic or passive. According to one illustrative embodiment, at least one of the optical elements in the intersection changes state to switch the interconnection from a through state to a crossed state.

A third step includes connecting computing elements to the optical fabric (step 1220). For example, a primary computing device or network may be connected to the bus lines and a number of other computing devices may be connected to the tap lines. For example, the bus lines may be connected to a larger computing network or router and the tap lines may be connected to a number of blade computer elements. Each of the blade computer elements may be connected to multiple tap lines. For example, each blade computer element may use 16 tap lines for inbound communication and 16 tap lines for outbound communication. In other embodiments, the computing devices may use more or less tap lines for bidirectional communication. For example, the computing device may use 16 tap lines in a bidirectional manner. Additionally, the computing device may use wavelength division multiplexing for bidirectional communication over a given line set.

As discussed above, the bus ports may be connected in a variety of locations along the bus lines. In some embodiments, it may be advantageous to locate the bus ports at one end of the bus lines. In other embodiments, bus ports may be attached to the center of the bus lines and distribute optical signals in both directions through the bus lines. In general, the location of the bus ports on the bus lines can be determined by a number of factors including: space constraints, connection constraints, optical loss budgeting, or other relevant criteria.

A fourth step includes dynamically switching the optical elements within the crossbar optical fabric to connect desired tap lines to the bus lines (step 1230). For example, dynamically switching the optical elements may include separately switching a number individual elements or moving a block of elements with a single actuator. By way of example and not limitation, this switching may include moving a solid periscope prism into the path of a bus line, tilting mirror into the path of a bus line, or opening a light valve to allow passage of optical signals from a bus line into a tap line.

A fifth step includes directing the optical signals between the tap lines and bus lines (step 1240). According to one illustrative embodiment, the optical signal from multiple tap lines may be connected to a single bus line using a series of combiner elements. Additionally or alternatively, a single tap line may be simultaneously connected to two or more bus lines.

In sum, the optical interconnect fabric described above provides a number of advantages including: low cost, non-blocking configuration, low power, multicast capable and fast switching. The various embodiments of the invention are not mutually exclusive. For example, crosspoint switches, dynamic mirrors, light valves and periscope prisms can be intermingled within a single optical fabric. Additionally, the various optical elements can be used separately, in conjunction with each other, or can be substituted for each other. Further, the tap routing embodiments described above are only illustrative examples and can be combined or modified to produce the desired routing.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A circuit switched optical interconnection fabric comprising:
   a first hollow metal waveguide;
   a second hollow metal waveguide which intersects the first hollow metal waveguide to form an intersection;
   an optical element within the intersection configured to selectively direct an optical signal between the first hollow metal waveguide and the second hollow metal waveguide, wherein the optical element comprises a periscope prism; and
   a bus port connected to the first hollow metal waveguide and generating optical signals which pass through the first hollow metal waveguide.

2. The fabric of claim 1, further comprising a source of optical signals connected to the first hollow metal waveguide and a computing element optically connected to the second hollow metal waveguide.

3. The fabric of claim 1, in which the optical element is a crosspoint switch which is configured to simultaneously switch a plurality of optical paths between a through state and a crossed state.

4. The fabric of claim 3, in which the crosspoint switch comprises:
   a first layer with a plurality of through hollow metal waveguides;
   a second layer with a plurality of crossed hollow metal waveguides configured to divert optical signals from the first hollow metal waveguide into the second hollow metal waveguide and vice versa; and
   a spacer layer interposed between the first layer and second layer;
   in which the crosspoint switch is configured to be received in a socket in backplane containing the first hollow metal waveguide, the crosspoint switch being mechanically actuated to align the first hollow metal waveguide with one of the hollow metal waveguides in either the first layer and second layer of the crosspoint switch.

5. The fabric of claim 1, in which the optical element comprises a periscope prism which selectively directs an optical signal from the first hollow metal waveguide to the second hollow metal waveguide; the periscope prism being mechanically actuated such that it can be selectively extended into and withdrawn from an optical path within the first hollow metal waveguide.

6. The fabric of claim 5, in which the periscope prism reroutes the optical signal from the first hollow metal waveguide to a second hollow metal waveguide by interposing a first surface into the optical path, the first surface directing incoming optical signal upward; a second surface directing the optical signal horizontally and at approximately a 90 degree angle from the incoming optical signal.

7. The fabric of claim 1, in which the optical element comprises a dynamic mirror placed within the first hollow metal waveguide; the dynamic mirror having a first state which allows an optical signal to pass through the first hollow metal waveguide substantially unimpeded and second state which redirects the optical signal from the first hollow metal waveguide to a second intersecting hollow metal waveguide.

8. The fabric of claim 1, in which the optical signal passing through a first hollow metal waveguide is passively distributed to all intersecting waveguides.

9. The fabric of claim 1, in which a single second hollow metal waveguide is configured to receive optical signals diverted from a plurality of first hollow metal waveguides.

10. The fabric of claim 1, in which:
    the first hollow metal waveguide is one of a plurality of first hollow metal waveguides;
    the bus ports is one of a plurality of bus ports; and
    the bus ports are optically connected to the plurality of first hollow metal waveguides near a mid-point of the plurality of first hollow metal waveguides, optical signals generated by the bus ports being directed in opposite directions down the length of the plurality of first hollow metal waveguides.

11. The fabric of claim 1, further comprising a computing element connected to the fabric, the computing element having dedicated optical input and optical output lines which are configured to be selectively connected to the fabric by a plurality of the optical elements.

12. The fabric of claim 1, wherein the optical element is configured to selectively directing a plurality of laterally spaced optical channels for each of two-way communication directions between the first and second hollow metal waveguides.

13. The fabric of claim 1, wherein the optical element comprises:
    a first layer with a plurality of through waveguides;
    a second layer with a plurality of crossed waveguides configured to divert optical signals from the first hollow metal waveguide into the second hollow metal waveguide and vice versa; and
    an actuator to selectively couple the first layer or the second layer between the first and second hollow metal waveguides depending on whether optical signal in either of the waveguides is to be passed through or directed into the other of the two waveguides.

14. The fabric of claim 1, further comprising an actuator for moving said optical element between two positions to selectively direct the optical signal between the first and second hollow metal waveguides.

15. A circuit switched optical interconnection fabric comprising:
    a first hollow metal waveguide;

a second hollow metal waveguide which intersects the first hollow metal waveguide to form an intersection; and an optical element within the intersection configured to selectively direct an optical signal between the first hollow metal waveguide and the second hollow metal waveguide;

in which area based optical reflectors of progressively larger size are located one in each intersection, the area-based optical reflectors being smallest near an optical source such that substantially equal power distribution is made among the intersecting waveguides.

16. The fabric of claim 15, further comprising light valves placed near each intersection; the light valves being configured to selectively allow and selectively block the travel of optical signals into the hollow metal waveguide into the intersecting waveguides.

17. The fabric of claim 15, further comprising bus ports connected to a plurality of first hollow metal waveguides and generating optical signals which pass through the plurality of first hollow metal waveguides.

18. The fabric of claim 15, wherein the optical element comprises a periscope prism.

19. A circuit switched optical interconnection fabric comprising:

a first hollow metal waveguide;

a second hollow metal waveguide which intersects the first hollow metal waveguide to form an intersection;

an optical element within the intersection configured to selectively direct an optical signal between the first hollow metal waveguide and the second hollow metal waveguide; and a number of optical combiners which combine optical signals extracted from a plurality of hollow metal waveguides into a reduced number of hollow metal waveguides.

20. A circuit switched optical interconnection fabric comprising:

a first hollow metal waveguide;

a second hollow metal waveguide which intersects the first hollow metal waveguide to form an intersection;

an optical element within the intersection configured to selectively direct an optical signal between the first hollow metal waveguide and the second hollow metal waveguide; and a bus port connected to the first hollow metal waveguide and generating optical signals which pass through the first hollow metal waveguide;

wherein said fabric is incorporated into a backplane for supporting a plurality of blade computers.

* * * * *